United States Patent [19]

Schwenker

[11] Patent Number: 5,066,127
[45] Date of Patent: Nov. 19, 1991

[54] STIGMATIC IMAGING WITH SPHERICAL CONCAVE DIFFRACTION GRATINGS

[75] Inventor: John P. Schwenker, Boulder, Colo.
[73] Assignee: Hyperfine, Inc., Boulder, Colo.
[21] Appl. No.: 399,854
[22] Filed: Aug. 29, 1989
[51] Int. Cl.$^5$ .............................................. G01J 3/20
[52] U.S. Cl. ................................... 356/328; 356/334
[58] Field of Search ............... 356/305, 326, 328, 331, 356/332, 334; 350/162.21

[56] References Cited

U.S. PATENT DOCUMENTS

| | | | |
|---|---|---|---|
| 3,985,443 | 10/1976 | Danielsson et al. | 356/305 |
| 4,455,088 | 6/1984 | Koike | 356/334 |
| 4,623,251 | 11/1986 | Pouey | 356/334 |

OTHER PUBLICATIONS

H. G. Beutler, "The Theory of the Concave Grating", J. Opt. Soc. Am. 35, 311–350 (1945), see p. 324.
T. Namioka, "Choice of Grating Mountings Suitable for a Monochromator in a Space Telescope", Space Astrophysics, W. Liller, Ed. (McGraw-Hill, New York, 1961), pp. 228–267.
S. A. Stezhnew & A. I. Andreeva, "Toroidal Diffraction Gratings for Seva-Namioka Monochromators", Opt. Spectrosc. Moscow 28, 426–428 (1970).
T. Harada, S. Moriyama, & T. Kita, "Mechanically Ruled Stigmatic Concave Gratings", Jpn. J. Appl. Phys. Supp. 14-1 14, 175-179 (1975).
F. M. Gerasimov, E. A. Yakolev, L. V. Peisakhson, & B. V. Koshelev, "Concave Diffraction Gratings with Variable Spacing", Opt. Spectrosc. Moscow 28, 423–426 (1970).
H. Noda, T. Namioka, & M. Seya, "Aberration-Reduced Holographic Concave Gratings for Seya-Namioka Monochromators", Jpn. H. Appl. Phys. Suppl. 14-1 14, 187–191 (1975).
W. Werner, "The Geometric Optical Aberration Theory of Diffraction Gratings", Appl. Opt. 6, 1691-1699 (1967).
Advertisement page for the Model VM-521 and the Model VM-523 Vacuum Monochromators.
James A. R. Samson, "Techniques of Vacuum Ultraviolet Spectroscopy", Chapter 2, The Concave Diffraction Grating, p. 5, (1967).

Primary Examiner—F. L. Evans
Attorney, Agent, or Firm—James R. Young

[57] ABSTRACT

An improved method and apparatus for focused stigmatic imaging with spherical concave diffraction gratings incorporates a concave spherical diffraction grating with parallel, normally ruled lines. An entrance light beam source or projector propagates a beam of light to be analyzed through an entrance point and onto the surface of the diffraction grating. A light detector or analyzer is positioned at or near a detection point for detecting or characterizing the light diffracted from the grating. The entrance point and detection point are positioned in spaced-apart relation to each other and to the grating according to disclosed formulae, such that they are in respectively corresponding stigmatic or near stigmatic focus with each other.

4 Claims, 13 Drawing Sheets

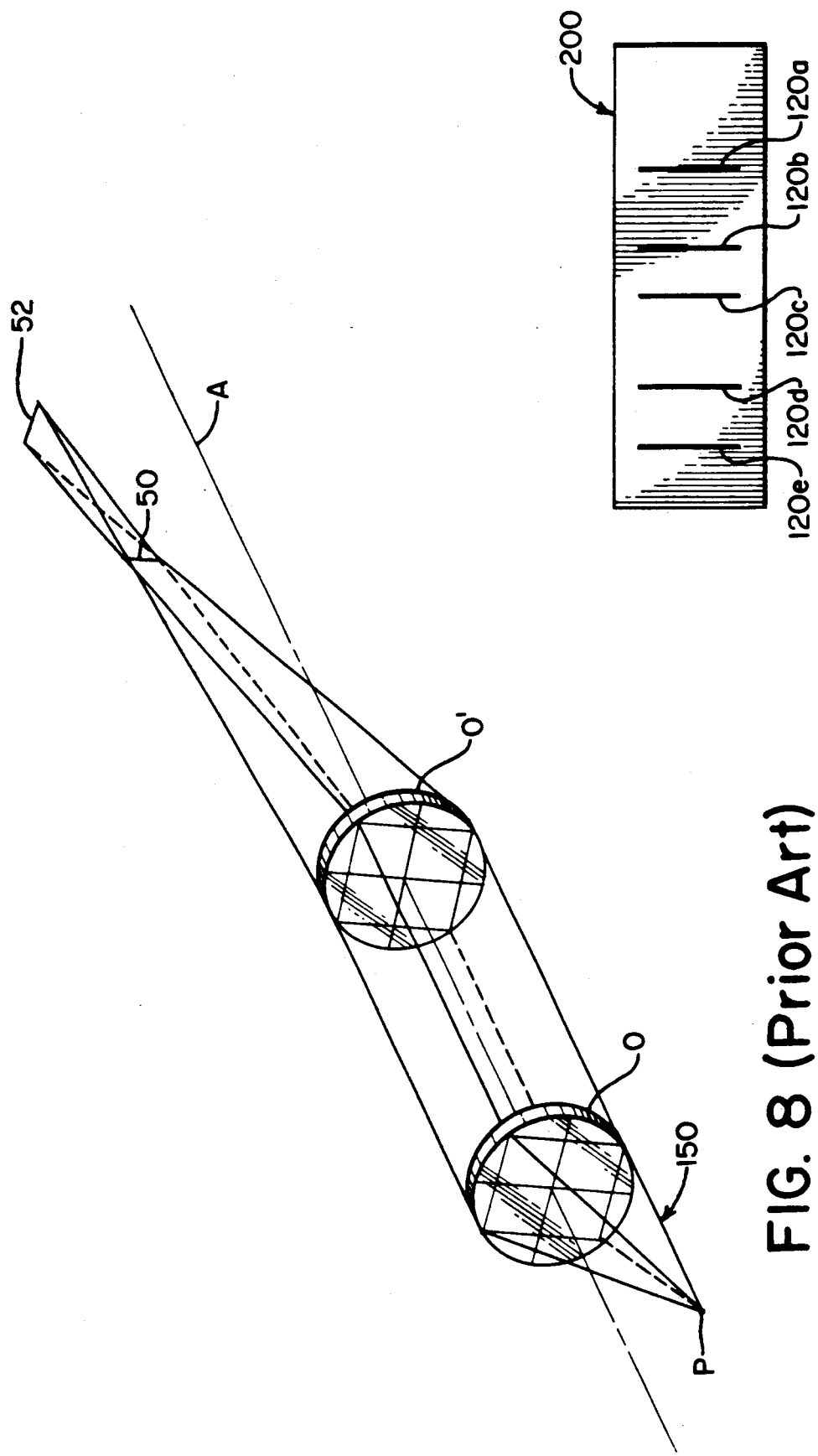

STIGMATIC IMAGING WITH SPHERICAL CONCAVE DIFFRACTION GRATINGS

BACKGROUND OF THE INVENTION

1. Field of the Invention

This invention relates to optical spectroscopy in general, and to optical spectroscopy systems using concave diffraction gratings in particular.

2. Description of the Prior Art

Optical spectrometry and spectroscopy systems usually operate on one of two principles, refraction or diffraction. A beam of light is either refracted or diffracted to separate the various wavelengths of light from each other so that the presence or absence of light in the respective wavelength ranges or bands can be determined.

Refractive systems typically use some refractive device, usually in the form of a prism, to disperse the beam of light to be investigated into its component wavelengths. Such refractive devices operate on the principle that the refractive index of the device varies with wavelength so that different component colors in a beam of light are angularly dispersed at respectively different angles as they pass-through the refracting device.

Refractive or prism spectrometers have been in use for a long time. However, they suffer from several limitations. For example, the refractive material or medium, usually glass, absorbs certain wavelengths, thereby limiting the spectral range that can be investigated. Refractive materials, such as glass, may also introduce chromatic aberrations, since the focal length of a glass lens is slightly different for each wavelength. Finally, such refractive spectrometers are further limited to relatively small angles of incidence, thus restricting resolution.

Spectrometers can also be made with diffraction gratings to disperse the light by its respective wavelength components. Diffraction gratings are very useful and desirable in spectroscopy because of: their lack of chromatic aberration; their ability to proportionally disperse light by wavelength, even at large angles; and their ability to disperse very wide spectral ranges. The first diffraction gratings were planar, i.e., flat, and were either of the reflective or transmissive type. Reflection gratings usually have a flat, reflective surface with a series of diffractive elements, such as lines inscribed thereon ruled closely enough together to cause diffraction of the wavelengths of interest by means of constructive and destructive interference. Transmission gratings usually have as their diffractive elements either open slits in an opaque surface or transparent rulings or facets on the surface. While reflective and transmissive gratings operate somewhat differently, the results are essentially the same, i.e., both disperse light by wavelength.

While plane gratings are able to disperse light with the advantages listed above, they are unable to focus the dispersed beam. Practical use of a plane diffraction grating, therefore, requires the use of some focusing device, usually a glass lens or concave mirror, to focus the dispersed beam so that it can be studied. Such a glass lens, however, reintroduces the disadvantages of restricted spectral range and chromatic aberration associated with the refractive systems. Concave mirrors, on the other hand, can reduce throughput by the reflection inefficiencies resulting from additional reflections off the concave mirrors. Thus, spectroscopists continued searching for a system that could make full use of the advantages of the diffraction grating without introducing the substantial limitations associated with refractive-type systems. Such a system was found in the concave grating, which is essentially like a plane grating that is reformed to have a curved or concave surface.

An optical spectrometer utilizing a concave diffraction grating was first conceived by Prof. Rowland in 1882. Rowland's spectrometer combined the advantages of the plane diffraction grating with the focusing properties of a concave mirror. The resulting concave diffraction grating not only had the ability to disperse light of wide spectral ranges at large angles of incidence like the plane diffraction grating, but it could also focus at least one component of the dispersed beam without the narrow spectral range limitation and chromatic aberration associated with glass lenses. Specifically, Rowland found that when he ruled the diffraction grating on a blank having the shape of a portion of a spheroidal surface, one component, usually considered to be the vertical component, of the diffracted light fell into focus at a locus of points in space that describe an imaginary circle. This imaginary circle, which has become known as the Rowland circle, has a diameter equal to the radius of curvature of the spherical grating and is tangently located on the grating center. The Rowland circle forms the basis of nearly all vacuum spectrographs in use today.

Spectrometers based on the Rowland circle principal are used for many different purposes such as, for example, determining the wavelengths of light passed through materials to gain knowledge of the characteristics or chemical compositions of such materials or determining the characteristics of the light source. Such spectrometers can also be used as monochromators. A monochromator can be thought of as a precise optical filter. The layout of the monochromator is very similar to that of a conventional spectrometer, except that an exit pupil or slit is sized and positioned in a manner that blocks out all but a specific wavelength of the diffracted beam of light. In this manner, monochromators are useful as sources of monochromatic light to study the effects that one wavelength of light has on other elements. An example would be the use of a monochromator for emission spectroscopy where the monochromatic light output by the monochromator is passed through a gaseous sample to excite the various atoms therein. The emitted light from the excited atoms is then analyzed by passing it through yet another spectrometer. Emission spectroscopy often requires a fairly energetic monochromatic light source to properly excite a sample so that it emits sufficient light. Because of this high energy requirement, monochromators are sought that have as much light output, or throughput, as possible.

Quite often, these above listed spectroscopy applications are performed in a high vacuum environment to prevent the absorption of ultra-violet and higher frequencies of light by air molecules. Such spectrometers are usually called vacuum spectrographs or vacuum monochromators because the gratings and optical path are contained within vacuum chambers.

While the Rowland circle concept certainly represented such a substantial breakthrough in diffraction spectroscopy that it is still the standard in use today, it still suffers the significant drawback of introducing substantial astigmatism in the diffracted image. That is, only that component of light at right angles to the grating rulings, usually called the vertical component, is focused on the Rowland circle. The component of light that is parallel to the lines of the grating, usually called the horizontal component, falls into focus at some different point in space that is off the Rowland circle with one exception. The one exception is that stigmatic focus occurs theoretically at one point on the Rowland circle where a line that is normal to the center point of the grating intersects the Rowland circle, which also coincides with the center of curvature of the spherical grating. However, it is a physical impossibility to utilize this stigmatic imaging point fully, because such stigmation could only occur if the light source or entrance slit and the exit aperture or detector occupy the same position on that stigmatic point on the Rowland circle, which is impossible. Also, since that point is on the optical axis of the grating, no diffraction occurs. Usually, the horizontal component of the diffracted light focuses at a point that is a greater distance from the grating than the Rowland circle.

This astigmatism on the Rowland circle, i.e., focused vertical component but unfocused horizontal component, causes a substantial loss in the intensity of the diffracted beam as the resolved light in each wavelength or band is stretched out in a protracted line image instead of being concentrated at a point. This loss of intensity and stretching out of the wavelength band results in a total loss of any information relating the diffracted image to specific height positions along the entrance slit. Thus, imaging spectroscopy, where simultaneous spectroscopy of two sources or a complex image falling on the entrance slit, is impossible with an uncorrected diffractive spectrometer. The loss of intensity also reduces the available light or throughput in monochromator applications, thereby limiting usefulness. Moreover, the increased resolving power of newer gratings requires the use of narrower lines and finer grained plates, which further accentuates the intensity loss problem.

While the Rowland circle type mountings do have the disadvantage of substantial astigmatism, as described above, they have such excellent focus resolution and sharpness in the vertical component that the disadvantages of the astigmatism have generally been tolerated for most spectroscopic applications for decades. However, if the astigmatism could be eliminated, detection efficiency, throughput, and signal-to-noise ratio could be improved, because both the vertical and horizontal components would be focused together to converge the diffracted image to a focused, high luminosity point instead of the protracted line. Also, comparative spectroscopy, where two sources are projected through two halves of the same entrance slit, would also be enhanced. Such stigmatic imaging could also allow for two-dimensional spectroscopy, that is, where spectral and slit position information are gathered simultaneously. Thus, a person or electronic detector equipment could identify the light spectrum or wavelength bands present or absent at each point along an elongated entrance slit, instead of having to use a point entrance or source. Such an elongated entrance slit could, for example, be wiped or moved across an image of the sun or across a candle flame or other non-point light source, while taking continuous or intermittent real-time measurements of wavelengths at selected points along the entrance slit or even continuously along the entrance slit to obtain a two-dimensional reading of all the wavelengths present at all points on the sun or candle flame image. Finally, if the primary aberration of astigmatism could be eliminated, correction of other minor aberrations could be made more easily.

Modern spectroscopy developments have further highlighted the limitations caused by the astigmatism. For example, investigation of the hyperfine structure of spectral lines by either Fabry-Perot interferometry or Lummer plate interference patterns is not possible with an instrument that does not yield a stigmatic image of the entrance slit. For these applications, prism spectrographs are still used, which, of course, trades away the advantages inherent with the diffraction type spectrographs discussed above for such spectral line investigations.

Besides the technique of trying to mount an inlet slit or source and an outlet aperture or detector very close to each other adjacent the one theoretical stigmatic image point on the Rowland circle that is coincident with the center of curvature of the spherical grating, which is impractical and severely limiting, as described above, there have been, prior to this invention, only two options available to get stigmatic or near stigmatic imaging. The first of these previously known methods to achieve stigmatic or near stigmatic imaging has been to reshape the spherical diffraction grating or blank, and the second method is to change the densities, configurations, and orientations of the rulings. By varying the shape of the grating or blank to something other than a pure spherical surface, for example by closing the radius of the grating blank in the vertical dimension, the focal length of the horizontal component can be diminished while leaving the focal length of the vertical component the same, thereby collapsing the normal line image from a spherical grating down to a point. Such aspherical surfaces, usually ellipsoidal and toric, have been made and ruled normally. However, they are much more expensive and difficult to make than spherical gratings, and mathematically they are limited to being stigmatic at only one or two places on the Rowland circle, which is also quite limiting in utility.

In the second alternative, the spherical surfaces have been ruled non-normally, i.e., with grating lines variably spaced to vary the ruling density, or with grating lines that are curved or tilted to follow customized corrective specifications. These hybrid spherical gratings with modified ruling or grating lines are very difficult to make, very expensive, and they still have stigmatic points in usually only one or two, and so far no more than three places on the Rowland circle. There have been recent claims that holographical gratings with varied rulings have been made that can produce a line of focal points out of the Rowland circle. However, in addition to the difficulty and cost of manufacture, various performance characteristics of such alternate grating blanks, such as quality of rulings, and intensity characteristics, are almost always inferior to the normally ruled, spherical grating blanks known in the industry as the Type I devices.

Until this invention, spectroscopists had generally concluded that astigmatism, since it is present in all off-axis uses of spherical reflecting surfaces, must also be inescapable with concave gratings. Consequently, mountings developed for concave diffraction gratings have, with very few exceptions, been based on the Rowland circle concept, because the points on the Rowland circle have always provided unsurpassed spectral resolution, albeit astigmatic. Spectroscopists have generally accepted the severe astigmatism as the price to be paid for the high resolution, high quality spectral range, and affordability of the Type I spherical gratings.

SUMMARY OF THE INVENTION

Accordingly, it is a general object of this invention to provide an improved method and apparatus for mounting spherical, normally ruled gratings in a manner that reduces or eliminates astigmatism.

It is another general object of this invention to provide improved spectroscopic apparatus with greater flexibility and capabilities and that minimizes or eliminates the shortcomings and limitations of the prior art spectroscopic mountings that are based on the Rowland circle.

It is a further general object of this invention to provide an improved diffraction mounting that is simple, inexpensive and readily duplicated.

A more specific object of this invention is to provide an improved spectroscopic mounting that provides stigmatic imaging with a spherical, normally ruled, concave diffraction grating.

Another specific object of this invention is to provide an improved mounting that will allow two-dimensional and other nonconventional forms of spectroscopy, such as two sources through the same entrance slit for comparison spectroscopy.

It is also an object of this invention to provide an improved diffractive spectroscopy system in which the astigmatism has been eliminated so as to allow easier correction of the remaining minor aberrations.

It is still another object of this invention to provide an improved mounting for diffraction spectroscopy that provides an improved signal-to-noise ratio through the elimination of the intensity loss caused by astigmatism.

Yet another object of the present invention is to provide a method and apparatus for high resolution stigmatic imaging at image and object locations off the Rowland circle.

Another object of this invention is to provide a stigmatic vacuum spectrometer or spectrograph that can be readily incorporated with a minimum of modification to existing vacuum spectrometer systems.

Additional objects, advantages and novel features of the invention shall be set forth in part in the description that follows, and in part will become apparent to those skilled in the art upon examination of the following or may be learned by the practice of the invention. The objects and advantages of the invention may be realized and attained by means of the instrumentalities and in combinations particularly pointed out in the appended claims.

In accomplishing these and other objects, the spectroscopic apparatus of the present invention comprises a concave spherical diffraction grating with parallel, normally ruled lines, an entrance light beam source or projector for propagating a beam of light to be analyzed through an entrance point and onto the diffraction grating. A light detector or analyzer device is also positioned at or near a detection point for detecting or characterizing the light diffracted from the grating. The entrance point and detection point are positioned in spaced-apart relation to each other and to the grating such that they are in respectively corresponding stigmatic or near stigmatic focus with each other. Such spatial relationships among the entrance and detection points and the grating where such stigmatic focus occurs is described by the equations:

$$Z = R(1 + \cos 2\Theta)/2;$$

$$X = \pm Y = Z\left[((R/Z) - 1)/(2 - (R/Z))\right]^{\frac{1}{2}}; \text{ and}$$

$$\Theta = \sin^{-1} m\lambda/2d$$

where R is the radius of curvature of the grating, d is the spacing of the rulings, m is the order number of the diffracted beam being detected, $\lambda$ is the wavelength of the diffracted beam being detected, and $\Theta$ is the in plane diffraction angle for the particular grating and wavelength $\lambda$. The X, Y, and Z values in these equations are spatial positions in an X, Y, Z orthogonal coordinate system wherein the origin of the coordinate system is coincident with the optical center of the grating where the light beam is incident, the Z coordinate axis is collinear with optical axis, which is normal to and intersects the grating at the optical center, the X coordinate axis is orthogonal to both the Z-axis and the central ruling which extends through the optical center of the grating, and the Y coordinate axis is orthogonal to both the Z and X coordinate axes. In monochromator applications, a pupil can be placed at the detection point where stigmatic focus occurs for the specific wavelength desired for transmitting light of that wavelength while blocking or diverting other wavelengths. For imaging spectroscopy, the entrance beam can be projected toward the grating through an elongated entrance slit or linear array of entrance pupils that include the entrance point, and the detection or analyzing device can also be two-dimensional to detect the diffracted light that passed through various portions of the entrance slit or array, as well as to detect characteristics of the diffracted light, such as wavelength, intensity, and the like.

The method of the present invention can include the steps of projecting an incident light beam through the entrance point and onto the grating, and detecting or analyzing the diffracted light at the detection point, where the entrance and detection points are at or near the respective stigmatic focal points described by the above-equations. Where an elongated entrance slit or entrance pupil array is used, the source image or light source being analyzed can be moved in relation to the entrance slit or pupil array or vice versa while recording light characteristics at or near the detection point simultaneously with relative height position in the entrance slit or array corresponding to the light being analyzed on an intermittent or real time basis. Thus, a two-dimensional image of the light source with light characteristics across the image can be obtained.

BRIEF DESCRIPTION OF THE DRAWINGS

The accompanying drawings, which are incorporated herein and form a part of the specification illustrate the preferred embodiment of the present invention, and together with the description, serve to explain the principles of the invention.

In the drawings:

FIG. 8 is a schematic illustration of an astigmatic optical system for prior art background purposes;

FIG. 9 is an elevation view representation of a prior art astigmatic diffracted image of a light beam having a plurality of wavelength components;

DETAILED DESCRIPTION OF THE PREFERRED EMBODIMENT

The stigmatic and near stigmatic imaging systems utilizing a spherical, concave, diffraction grating according to the present invention are illustrated schematically in FIGS. 10, 11, 12, and 13 which will be described in detail below. However, since this subject matter and FIGS. 10, 11, 12, and 13 are complex, this invention may be described and understood more easily with a step-by-step explanation beginning with well-known prior art spectroscopy structures and methods and progressing to a full description of the spectroscopy structures and methods of this invention. For the purposes of this description, the term "stigmatic" as used herein refers to the condition of an optical system in which the horizontal and vertical components of all rays of light from a single point are focused upon a single point. The term "near stigmatic" as used herein refers to a neighborhood of points along a pencil of rays that are not fully stigmatic but may form images of spectroscopic value.

Figure 1:
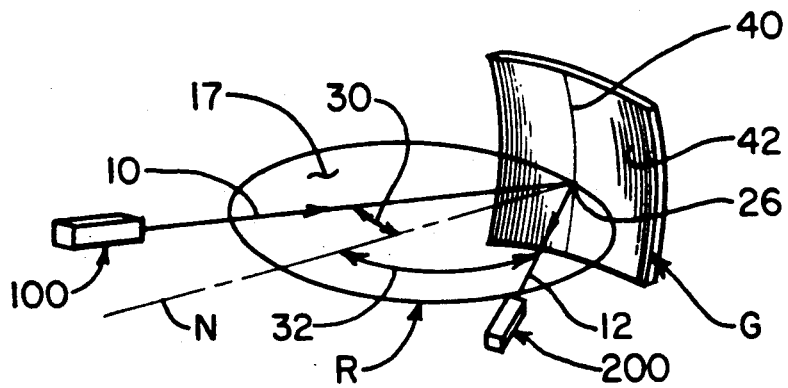
FIG. 1 is a three-dimensional isometric representation of a prior art Rowland circle based spectroscopic system.
Figure 2:
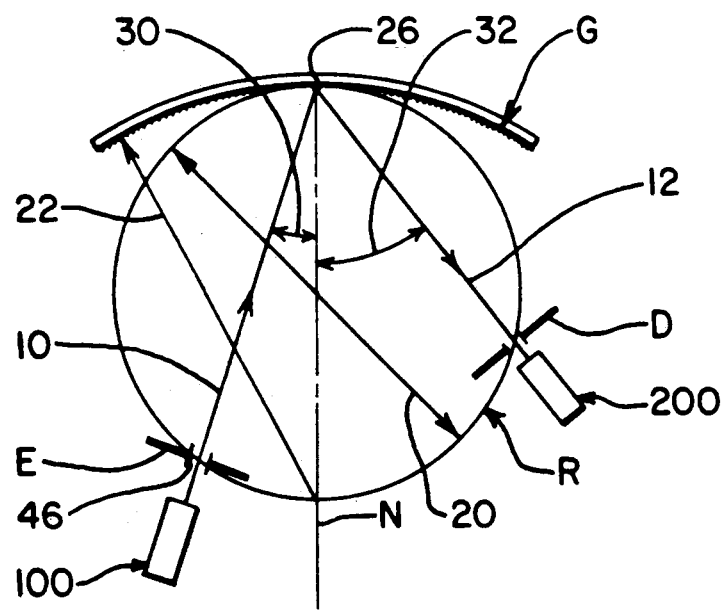
FIG. 2 is a plan view schematic diagram of the conventional prior art system of FIG. 1 showing the concave, spherical diffraction grating and the Rowland circle.

A typical well-known prior art spectroscopy system based on the Rowland circle concept is shown schematically in FIGS. 1 and 2, wherein FIG. 1 is an isometric 3-dimensional depiction of a Rowland circle-based mounting and FIG. 2 is a top plan view of the FIG. 1 schematic. An incident beam 10 is projected by a conventional projecting apparatus or light source 100 through an entrance pupil E onto a normally ruled spherical diffraction grating G, where the beam is diffracted and separated into its component wavelengths and then detected by an optical detector or passes through a detector slit D, as will be described in more detail below.

In most conventional prior art spectroscopic mountings, it has been advantageous to place both the projecting apparatus 100, or entrance pupil E, depending on the application, and detector 200, or exit pupil D, somewhere on the circumference of a Rowland circle R, as shown in FIGS. 1 and 2. The Rowland circle R is a circle having a diameter 20 equal to the radius of curvature 22 of the spherical, concave diffraction grating G, as best seen in FIG. 2. The Rowland circle R lays in a Rowland circle plane 17 that is normal to the central ruling 40 of the grating G, as shown in FIG. 1. The concave diffraction grating G, as mentioned above, is of a conventional spherical form having a plurality of diffractive elements or fine rulings 42 inscribed thereon. The centermost of these rulings 40, sometimes referred to as the central ruling, lies in a plane normal to the Rowland circle and passes through the center of curvature point of the surface. The remaining rulings 42 lie in planes parallel to the central ruling 40.

In the typical prior art Rowland circle system of FIGS. 1 and 2, the centerline of the incident beam 10, having passed through an aperture 46 of entrance pupil E, strikes the surface of the spherical diffraction grating G at the point 26 that is common to the central ruling 40 and the Rowland circle R and at an angle of incidence 30. The angle of incidence 30 is measured from a normal axis N, which lays in Rowland circle plane 17 and is normal to the central ruling 40 of grating G. Upon striking the surface of grating G, the centerline of the incident beam 10 is diffracted at a diffraction angle 32, forming a diffracted beam 12. The diffraction angle 32 is measured from the normal axis N to the centerline of the diffracted beam 12.

Figure 3:
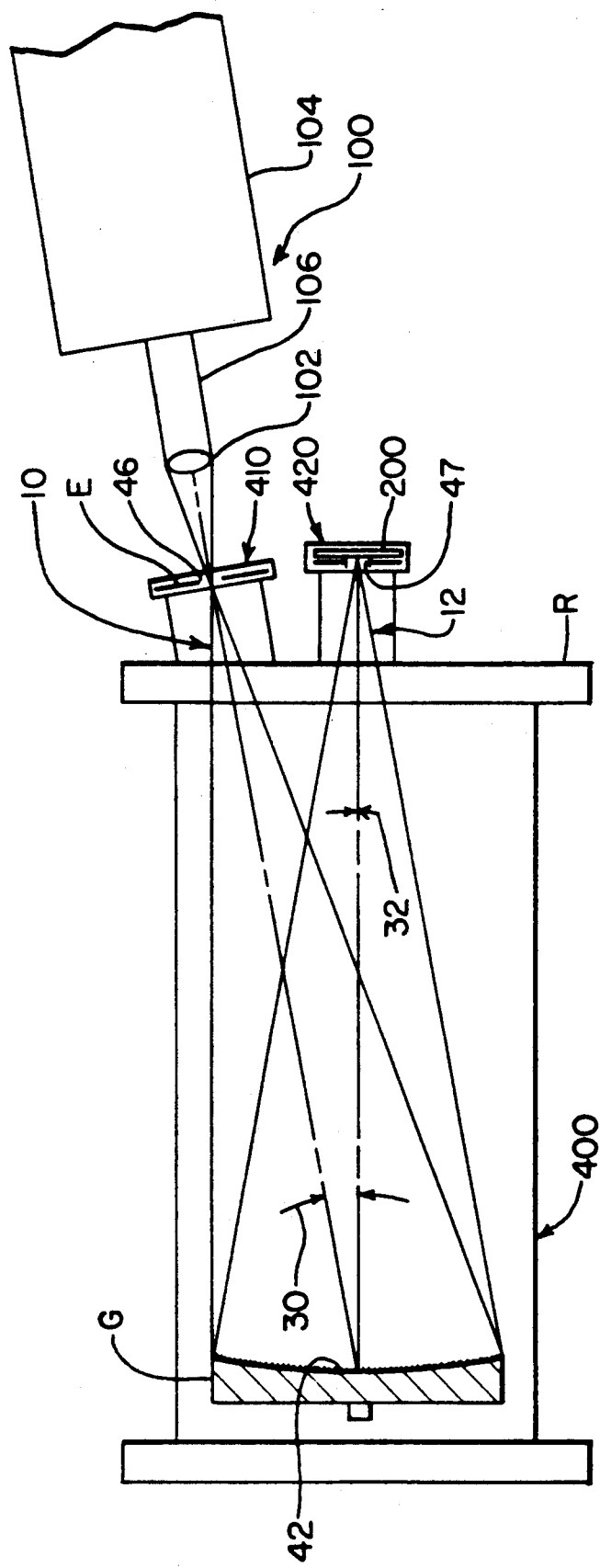
FIG. 3 is a schematic view in elevation of prior art vacuum spectroscopic apparatus utilizing the Rowland circle concepts of FIGS. 1 and 2.

While the schematic representations of FIGS. 1 and 2 provide an orientation to the Rowland circle scheme, the one-dimensional incident and refracted beams 10, 12 illustrated in those figures are only schematic and do not show the components of the beams. Actually, the incident beam may be comprised of one or many wavelength components, depending on the light source or projecting apparatus 100 used. The projecting apparatus 100 can also take many forms depending on the source to be analyzed. For example, if the light from a distant star is to be investigated, the projecting apparatus could be a telescope to gather and focus the image of the star at the pupil E. Similarly, as shown in FIG. 3, a microscope objective lens 102 could be used to focus the parallel, coherent beam 106 of a laser 104 at the pupil E so that the entire surface of the grating G would be illuminated by the beam instead of merely a small point on the grating surface. As would be known to someone skilled in this art, the entrance pupil E may or may not be required in a spectrographic system depending on the application. If an entrance pupil E is used, it could take the form of an elongated slit or it could be a simple circular aperture. The specific shape of the pupil E would be selected by the spectroscopist according to the particular application. By way of example only, an elongated entrance slit is usually used in monochromators to make as much light available as possible to overcome the disadvantageous astigmatism present in these prior art systems.

Figure 4:
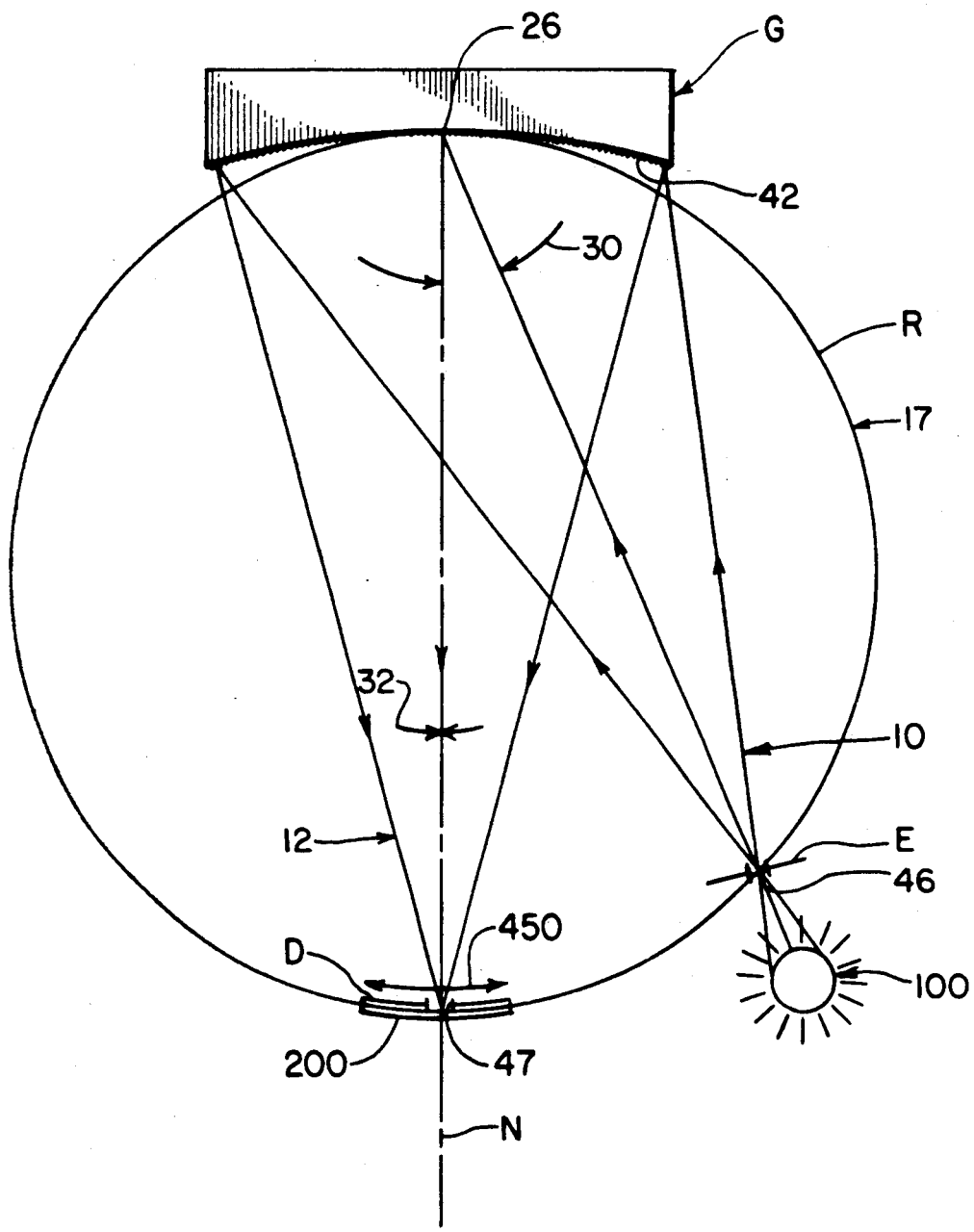
FIG. 4 is a schematic plan view of the prior art Rowland circle based spectroscope of FIG. 3 illustrating a mounting with a diffraction angle of 0°.

The popular prior art spectroscope mounting illustrated in elevational section in FIG. 3 and in schematic plan in FIG. 4 sets the diffraction angle 32 at 0°, so that it is collinear with the normal N of the grating G. The detection device 200, used with or without exit pupil D, like entrance pupil E, also lays on the circumference of the Rowland circle R in Rowland circle plane 17 as discussed above. If an exit pupil D is to be used, the diffracted beam 12 is then detected through an aperture 47 in detection pupil D by a suitable detector 200, such as a photosensitive diode, an array of photosensitive diodes, a vidicon tube, or similar device. If an exit pupil D is not used, the diffracted beam 12 can be observed visually on an image surface 200 or photographed by suitable photographic means.

Further, the actual refracted beam 12 may not be merely a two-dimensional line, as depicted for simplicity in FIGS. 1 and 2, or even a point of focus, as depicted in FIGS. 3 and 4. If there is more than one wavelength component in the incident beam 10, the diffracted beam 12 is really more in the nature of a plurality of diffracted beam components diffracted at different angles, such as, for example, the separate beams components 12a-e depicted in FIG. 5 fanning out from the point of incidence 26 on the grating G, each of which components represents a different wavelength component of the beam 12. In other words, because the angle of diffraction varies as a function of wavelength, each diffracted wavelength component 12a-e of beam 12 has a different angle of diffraction 32a-e. Thus, each diffracted beam wavelength component 12a-e actually falls on a different location 200a-e on detector 200. Thus, detection apparatus 200 can be, for example, an incident plane or photographic plate for a visual image or a plurality of electronic imaging detectors, such as CCD's, microchannel arrays, or vidicon tubes, for an image signal, to detect the various component wavelengths 12a-e present in the beam 12.

Figure 6:
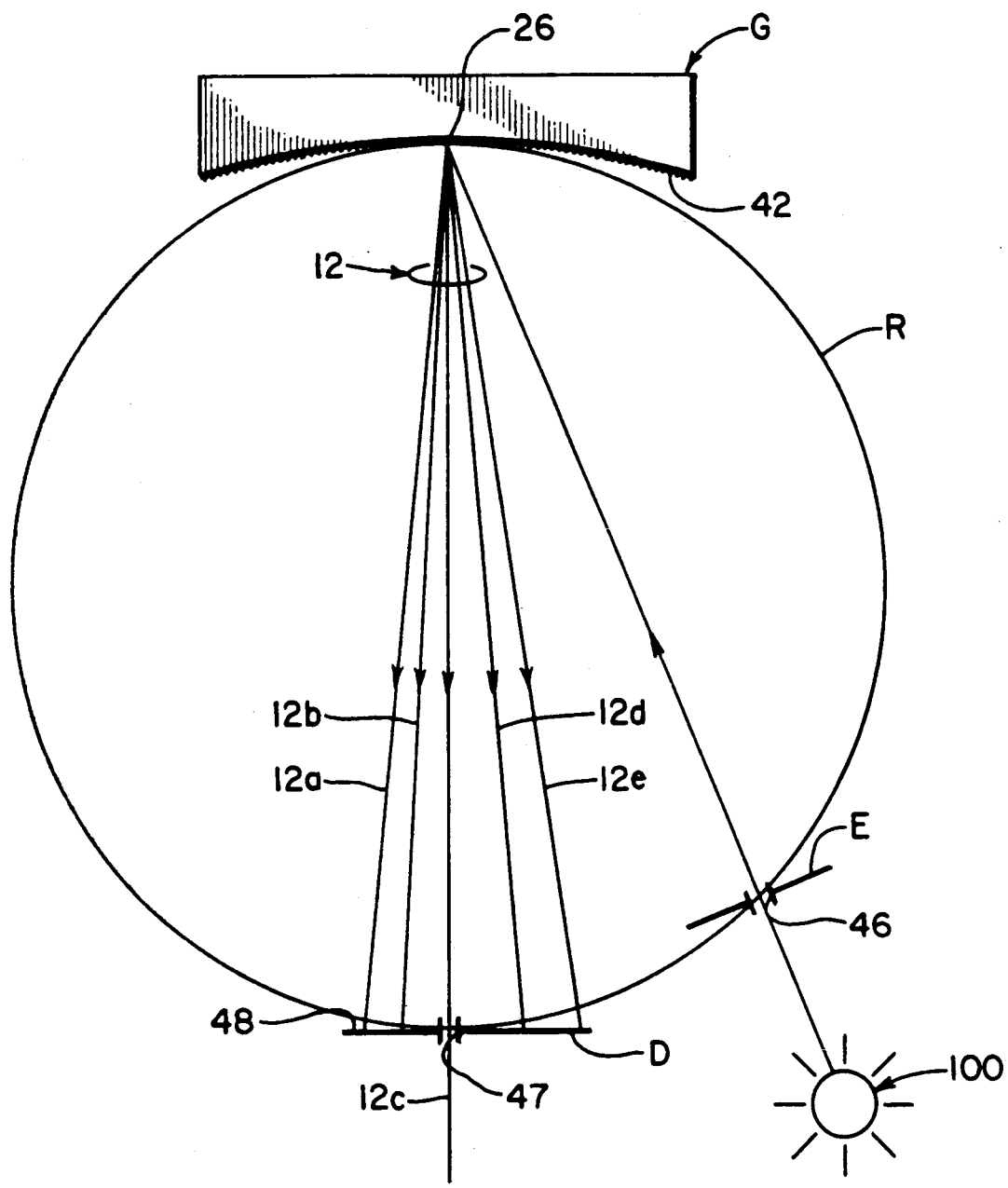
FIG. 6 is a schematic plan view of the prior art Rowland circle mounting utilized in a monochromator application.

In monochromator applications, an exit pupil D, such as that shown in FIG. 6, with a mask or screen 48 can be used to screen or block out those unwanted wavelength components, such as 12a, b, d, and e, and allow the passage only of a selected wavelength component, such as 12c. These spectrographic applications give an analyst valuable information about the chemical or physical make-up or structure of the light source, or of materials through which the light passes, depending on the specific spectroscopic application or monochromator being used.

Figure 5:
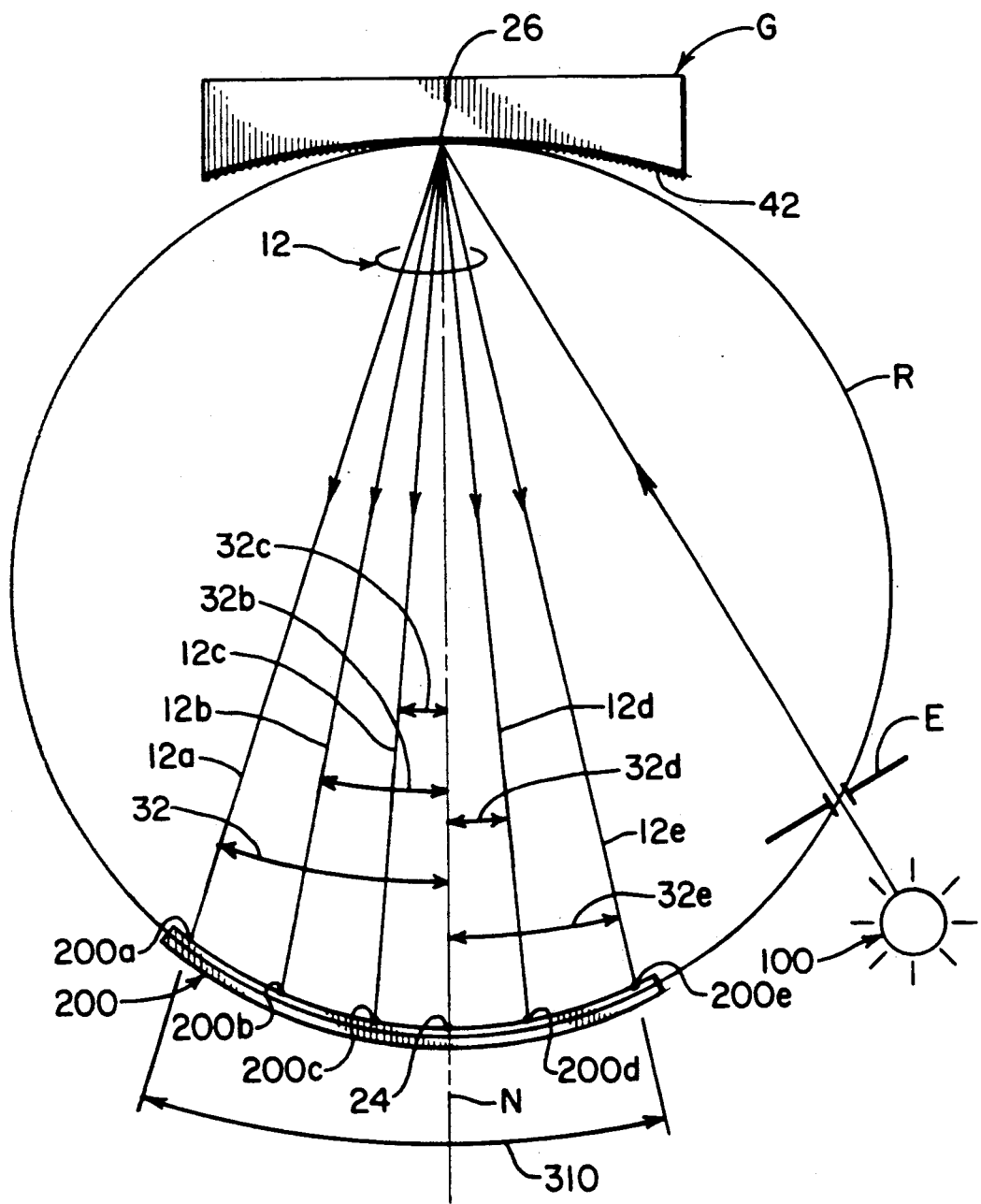
FIG. 5 is a schematic plan view of the prior art Rowland circle mounting of FIG. 4, but further showing the beam diffracted into its component wavelengths.
Figure 7:
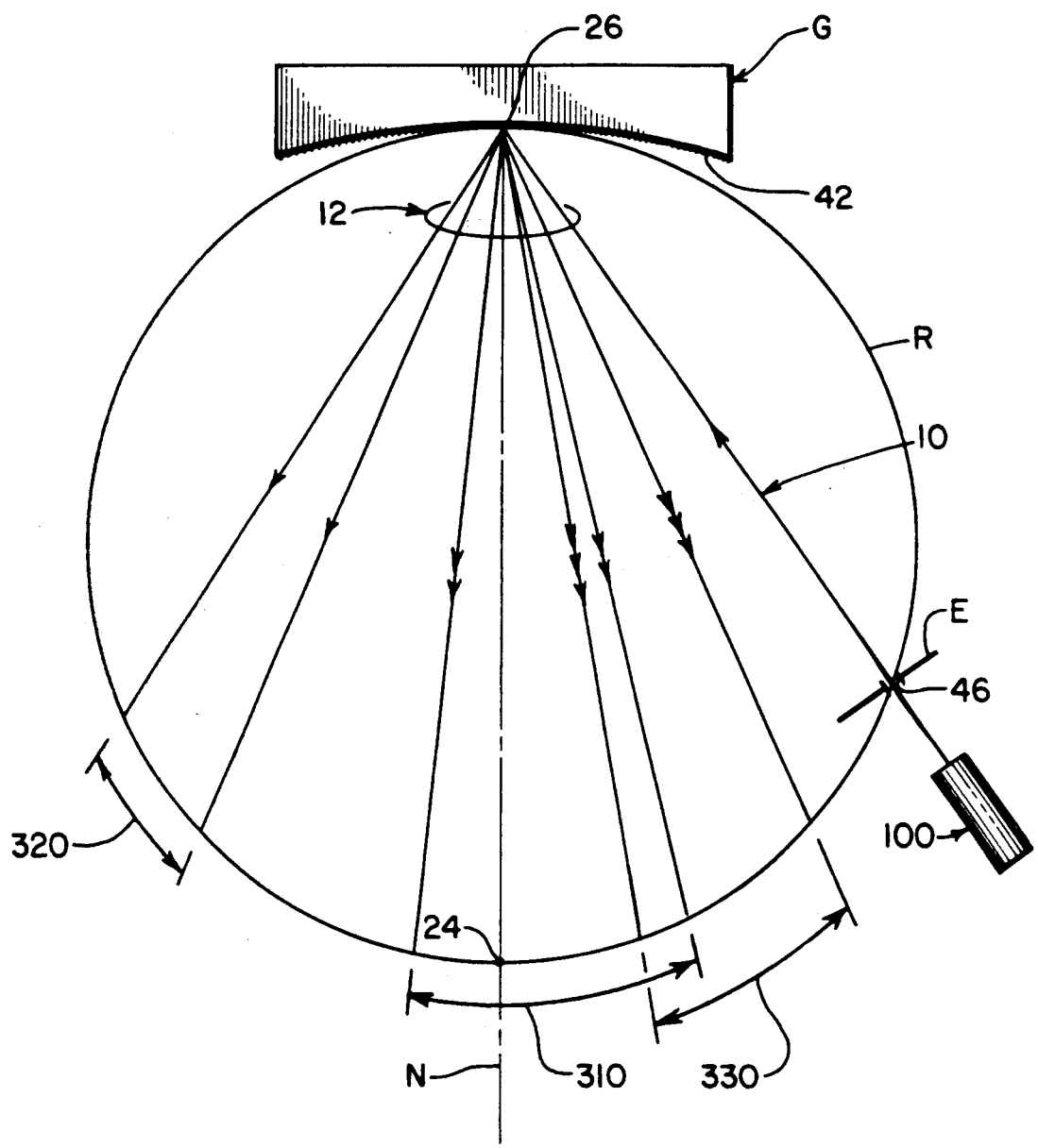
FIG. 7 is a schematic plan view of the prior art Rowland circle spectroscopic mounting of FIG. 4, but further illustrating various multiple orders of diffracted light beams.

Actually, in many circumstances the diffraction grating may separate the incident beam 10 into not just one set 310 of individual wavelength components 12a-e, as shown in FIG. 5, but into a plurality of such sets, such as those shown at 310, 320, 330, as illustrated in FIG. 7. Each set 310, 320, 330 contains all of the individual wavelengths that comprise the incident beam 10. The existence of such multiple sets or orders is related to the ruling 42 densities and characteristics on the grating G. Generally, the more dense the rulings 42, the less likely there will be such multiple sets or orders. Sometimes, depending on the particular grating, several of these sets can overlap, as illustrated by sets 310, 330 in FIG. 7. It is conventional to refer to each set of diffracted beams by an order number. For example, the primary set 310 is the first order diffraction pattern, the second set 320 is the second order diffraction pattern, etc. Having explained this known characteristic as a basis for description of the present invention, the plurality of orders of diffraction patterns will not be discussed further, it being assumed that the first order is sufficient for explanation of this invention and that once the invention is understood, persons having ordinary skill in this art will recognize how to apply it to higher order diffraction patterns if desired.

It is also appropriate to mention that in such prior art Rowland circle-based systems as described above, only that component of the diffracted beam 12 perpendicular to the grating rulings 42, i.e., the vertical component, falls into focus at detection pupil D on the Rowland circle R. The parallel or horizontal component is astigmatic and does not fall into focus on the Rowland circle R. Instead, the horizontal component usually has a longer focal length than the vertical component and falls into focus someplace outside the Rowland circle. The resulting images of the component wavelength bands 12a-e present in the diffracted beam 12 therefore appear on detection apparatus 200 as respective colored lines, rather than as respective colored points. Such astigmatism phenomenon discussed above is best understood by referring to FIG. 8 which is drawn for simplicity as a double lens system extending along an optical axis A rather than as a diffraction system, but the astigmatic phenomenon and result are the same. Light 150 emanating from a point P not laying on optical axis A passes through optical elements O and O', which collect and focus the image of point P. In this type of off-axis use, uncorrected optical systems are incapable of stigmatic focusing, thus resulting in a vertical focus 50, and a horizontal focus 52 occurring at different locations in space. The result is two focused images 50, 52 at different points in space, each being linear in shape rather than a point focus. If the light 150 emanating from the point P contains more than one wavelength, each wavelength component will have a separate vertical line focus and a separate horizontal line focus. Further, each vertical line focus of each wavelength component is spatially separated from the others.

Applying this astigmatism phenomenon to normally ruled spherical diffraction gratings, such as the grating G described above, when the incident pupil E or light source is anywhere on the Rowland circle other than on the normal axis N, only the vertical component of each wavelength 12a-e from FIG. 5 focuses at the detector 200 on the Rowland circle. That vertical component of each wavelength 12a-e focuses in a line, not a point, such that the combined images on the detector 200 appear as a plurality of lines 120a-e, as illustrated in FIG. 9, wherein the line images 120a-e correspond to the diffracted wavelength components 12a-e, respectively, of diffracted beam 12 in FIG. 5. Since each line image 120a-e of FIG. 5 is formed by light with a distinct wavelength different from the others, each line image 120a-e will appear on the detector 200 as a different color of the spectrum. Further, since the energy present in each wavelength band 120a-e is stretched out along a line instead of concentrated at a point, it has less intensity and is more difficult to detect with electronic transducers and more susceptible to interference from extraneous noise, which are problems inherent in astigmatic spectroscopy.

Figure 10:
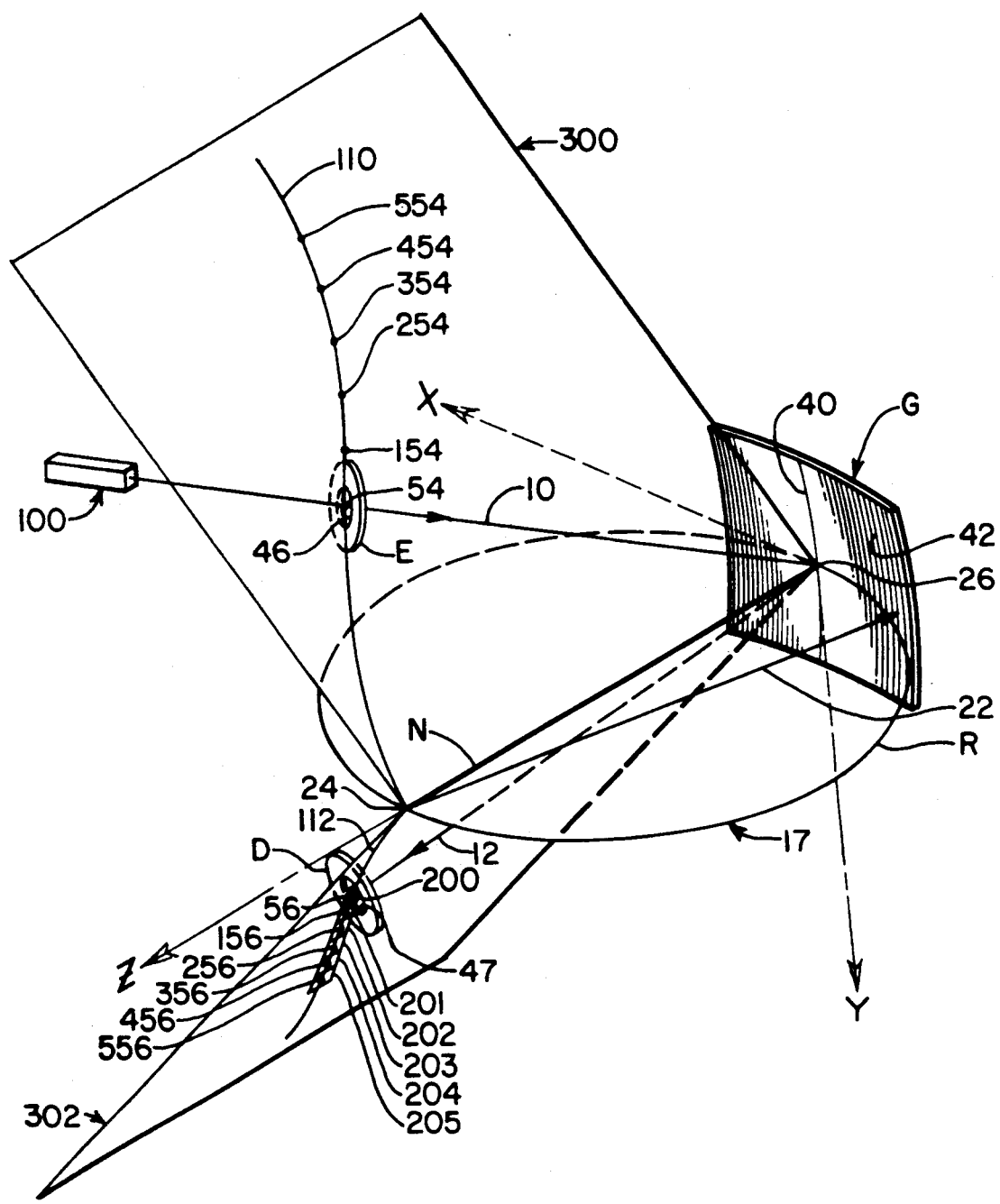
FIG. 10 is an isometric schematic view of the stigmatic image mounting of the present invention.
Figure 11:
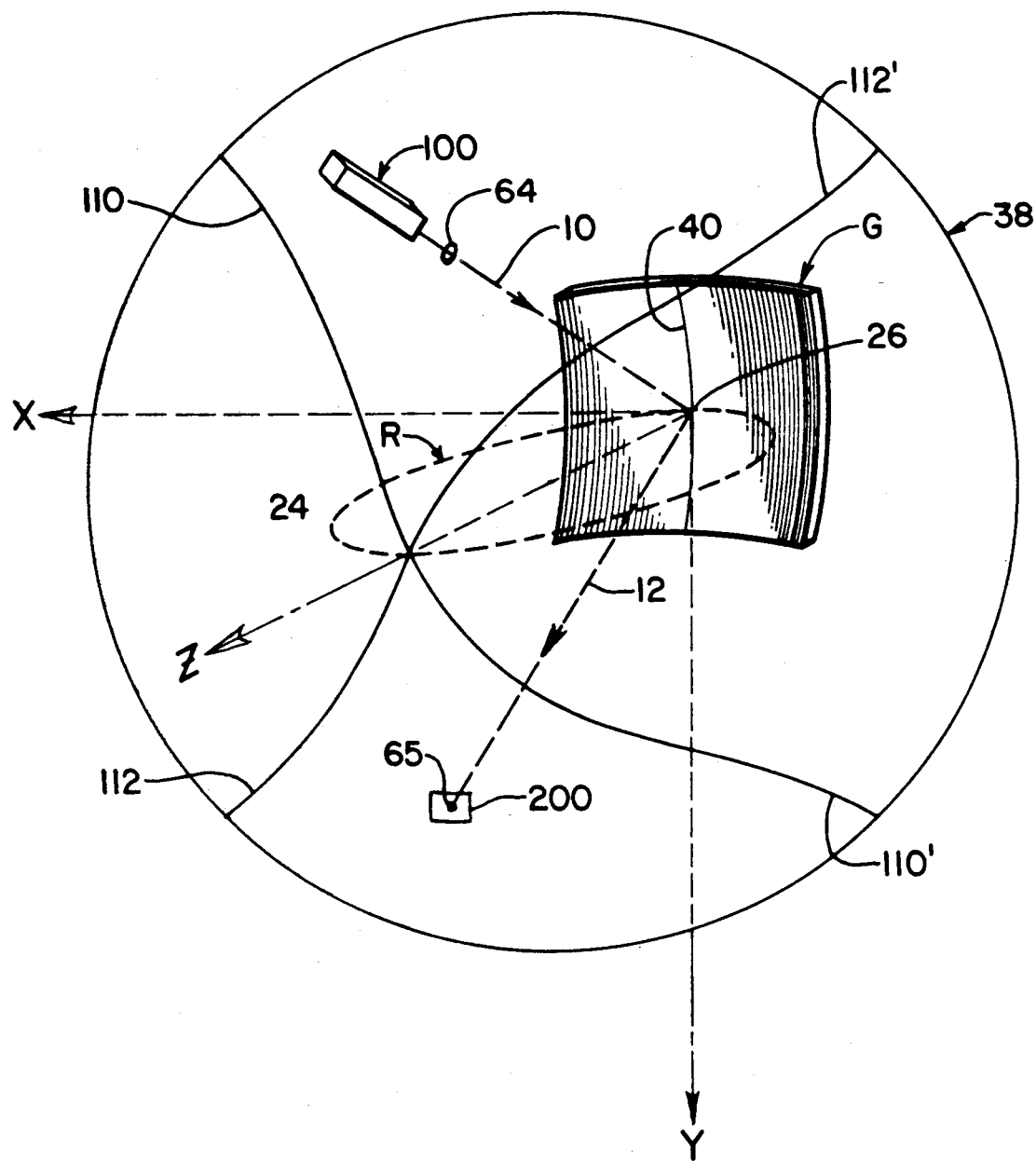
FIG. 11 is an isometric view of the near stigmatic image mounting according to the present invention.
Figure 12:
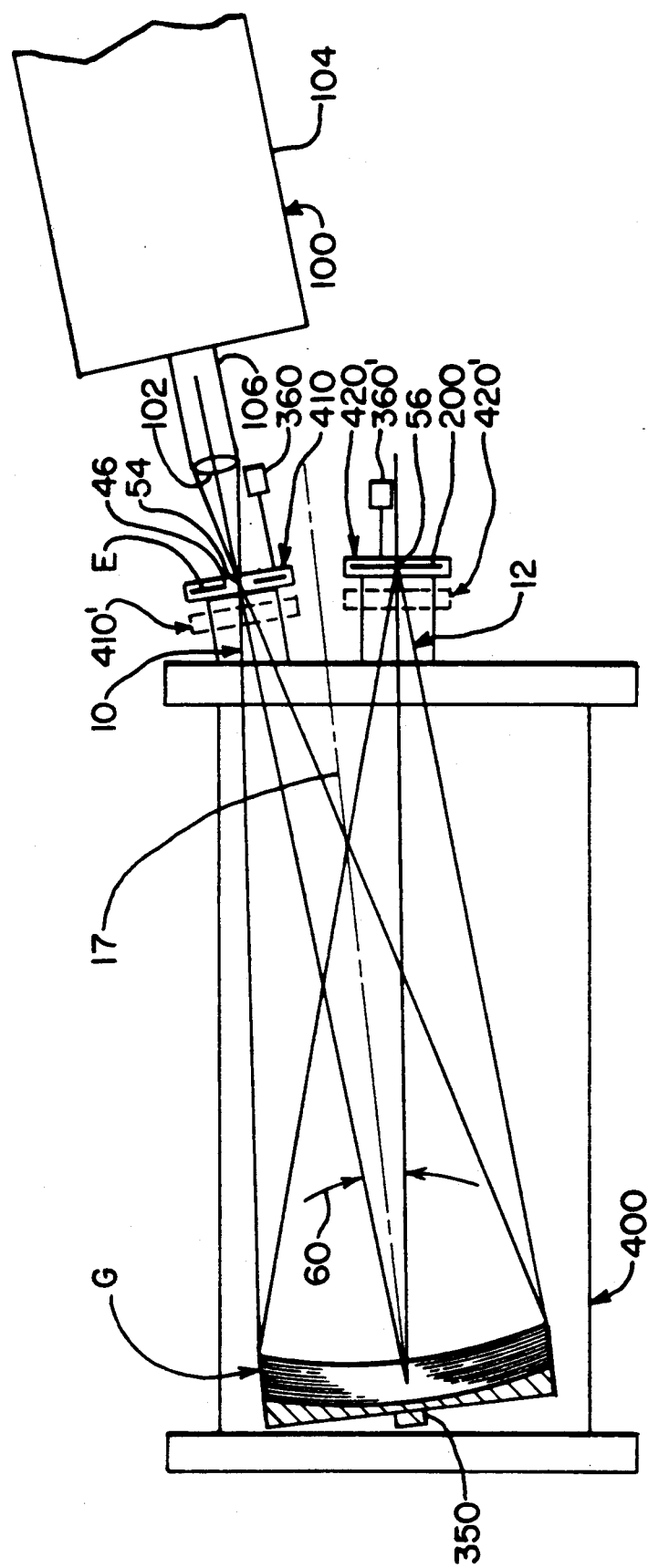
FIG. 12 is a schematic view in elevation of a vacuum spectrometer according to the present invention.

With the preceding discussion of known prior art principles in mind, the details of the present invention are best understood by reference first to FIGS. 10, 11, 12, and 13. A concave spherical diffraction grating G having a plurality of rulings 42, one of which is a central ruling 40, inscribed thereon has its center of curvature at a point 24 along an optical axis N that also passes through the center of central ruling 40 at a point 26, similar to the Rowland circle mountings described above. The Rowland circle R is shown in FIGS. 10 and 11 as a reference from which to distinguish the spectrometer mounting and method of this invention from previously known spectrometer arrangements and mountings that are based on the Rowland circle, but the Rowland circle has no significance to the present invention other than to note that the input and output focal points of this invention are optically removed from the Rowland circle R and the Rowland circle plane 17. For example, the center of an aperture 46 in entrance pupil E, or projecting apparatus 100, is located, according to this invention, at a first stigmatic focus 54 that is not contained in Rowland circle plane 17, as best seen in FIGS. 10 and 12. Likewise, the center of an aperture 47 in exit pupil D, as shown in FIG. 10, or the detection apparatus 200 if no exit pupil is used, as shown in FIG. 12, is located at a corresponding second stigmatic focus 56 also not lying in Rowland circle plane 17.

This spectroscopic mounting of the entrance pupil E (or the projecting apparatus 100) and the exit pupil D (or the detection apparatus 200) at positions that are off the Rowland circle according to this invention has the distinct advantage of obtaining a focused stigmatic image at the detection apparatus 200, as well as the advantage of not being confined to the Rowland circle with a concave spherical, parallel ruled diffraction grating, as was the case prior to this invention. Specifically, it has been found according to this invention that a spectroscopic entrance or source E, 100 and a detector device D, 200 can be positioned at respective first stigmatic focus 54 and a corresponding second stigmatic focus 56 symmetrically disposed on opposite sides of the Rowland circle plane 17, as best seen in FIG. 10. For example, when an incident beam 10 is projected by a suitable projecting apparatus 100 located at, or projecting a beam 10 through, an entrance point positioned at first stigmatic focus 54, the beam 10 strikes the surface of spherical, normally ruled grating G and is diffracted and reflected as diffracted beam 12. The diffracted beam 12 falls into perfect stigmatic focus at second stigmatic focus or detection point 56, whereupon it is detected by a suitable detection apparatus 200 through aperture 47 of detection pupil D, or by a suitable alternative detection apparatus if no exit pupil D is used. Of course, the diffracted beam 12 is separated by diffraction into its constituent color or wavelength components 12a-e, which are not shown in FIGS. 10 and 12 to avoid cluttering those views, but which are similar to, and clearly understandable from those constituent wavelength components illustrated in FIG. 5.

Stigmatic spectroscopy according to this invention as described above can only be accomplished when the entrance point or focus 54 and detection point or focus 56 of FIGS. 10-13 are located within certain physical relationships with respect to the grating G and to each other. The parameters for these relative locations of the entrance point or focus 54 and detection point or focus 56 according to this invention were determined empirically and are described below. However, these spatial relationships can be explained and defined more clearly by understanding certain features of FIG. 10. Specifically, the spherical, parallel and normally ruled diffraction grating G is shown in FIG. 10 in relation to a set of orthogonal coordinate axes X, Y, and Z, and to Rowland circle R. The origin of coordinate axes X, Y, and Z is located at the center 26 of grating G. The Z axis is collinear with optical axis N, which passes through a point 24 on the Rowland circle R. This point 24 is also the center of the radius of curvature 22 of grating G, all as described above for the prior art Rowland circle mounting. The arrowheads on the axes X, Y, and Z indicate increasing positive values for purposes of the description below. Also shown as an aid to explaining the method described below are two planes 300 and 302. Plane 300 is the $Y = -X$ plane and plane 302 represents the $Y = X$ plane. Of course, these planes 300, 302 intersect along the Z axis. Only that portion of planes 300, 302 in the positive X domain are shown for clarity, to avoid clutter in the drawings, and for ease of explanation. However, it should be understood that these planes extend infinitely outward in both the positive and negative X domains so the scope of the present invention should not be considered as limited to only those points in the positive X domain or to those illustrated in the planes 300, 302 shown in FIG. 10, as will become more clear from the description below.

While the respective entrance and detection points at stigmatic foci 54, 56 utilized in stigmatic imaging or spectroscopy according to this invention were determined empirically in the development of this invention, it has been found convenient for definitional and design purposes to also determine certain physical parameters and mathematic relationships between the characteristics of diffraction gratings G that can be used in spectroscopy according to this invention and the physical locations of corresponding input and output or detection stigmatic focal points, such as those at 54, 56 in FIG. 10, that may be created and utilized with such gratings G. Accordingly, to designate X, Y, and Z coordinates for respective corresponding entrance and detection points of stigmatic foci 54, 56, or of determining appropriate X, Y, and Z relationships for use of such foci in stigmatic imaging and spectroscopy according to this invention requires some knowledge of certain physical characteristics or parameters of the grating G and certain characteristics of the diffracted beam 12. The grating parameters chosen for definitional purposes according to this invention include the radius R of curvature 22 of the grating G and the spacing or separation d between the rulings 42 of grating G. Additionally, the wavelength λ and the order number m of the diffracted beam 12 to be investigated must be determined if not already known. This determination poses no difficulty since spectroscopists usually have a particular wavelength and order number in mind before performing spectroscopy. Once the above parameters are known, the X, Y, and Z coordinates of the respective entrance and detection stigmatic foci 54, 56 according to this invention may be described or defined by use of the following three empirically derived equations:

$$Z = R(1 + \cos 2\Theta)/2 \qquad (1)$$

$$X = \pm Y = Z\left[((R/Z) - 1)/(2 - (R/Z))\right]^{\frac{1}{2}} \qquad (2)$$

$$\Theta = \sin^{-1} m\lambda/2d \quad (3)$$

where:
- R = radius of curvature 22 of the grating G
- d = spacing of the rulings 42
- m = order of the diffracted beam 12 to be investigated
- λ = wavelength of the diffracted beam 12 to be investigated
- Θ = the in-plane diffraction angle for the particular grating G and wavelength λ.

The entrance and detection stigmatic foci 54, 56 are in corresponding pairs with a first or entrance focus 54 located on plane 300 and a second or detection focus 56 located on plane 302. This relationship is shown by equation (2) above, which yields two Y coordinates for any selected parameter set, i.e., Y=X and Y=−X. Hence, the entrance and detection focal points 54, 56 are symmetrically disposed on opposite sides of Rowland circle plane 17.

Moreover, since the grating parameters R and d are constant for a given grating G, lines of stigmatic foci for a given grating can be generated by iterating equations 1, 2, and 3 for different wavelengths λ or order numbers m. For example, lines 110, 112 of a locus of corresponding stigmatic entrance and detection foci positions could be generated for a given grating G and order number m by varying the wavelength λ. Thus, scanning spectroscopy according to this invention with stigmatic focusing can be performed by placing an entrance pupil E (or projecting apparatus 100) and detection pupil D (or the detecting apparatus 200) at a corresponding stigmatic entrance and detection foci pair 54, 56, which corresponding foci pair can be located anywhere on respective lines 110, 112 off the Rowland circle R. Again, as mentioned above, a particular spectroscopic application may or may not need entrance pupils E and D or detecting apparatus 100 and 200. Therefore, for convenience in describing this invention, entrance pupil E and exit pupil D will be used hereafter in a generic manner to describe and include any combination of projecting and detecting apparatus 100 and 200 with or without entrance and exit pupils E and D, and any combination of such pupils and/or detectors should be presumed to be included by reference herein to pupils E and D, even though detectors 100, 200 might not be mentioned specifically. Also, different wavelengths λ could then be scanned by moving pupils E and D along lines 110 and 112, respectively. Keep in mind however, that at any given time the entrance pupil E and detection pupil D must be on the proper pair of stigmatic foci 54, 56 as indicated by equations 1, 2, and 3. Since, as discussed earlier, the foci 54, 56 have opposite Y ordinates, the pupils E and D will always be symmetrically located on either side of plane 17. Similarly, lines 110, 112 can also be generated for fixed wavelengths λ and varying order numbers m or for different grating parameters. It is also appropriate to mention again that, while not shown, planes 300, 302 also extend the negative X, i.e., −X directions. Therefore, for entrance pupil E positions on the −X plane locations (not shown), there are corresponding Y and −Y coordinates. Thus, while not shown in FIG. 10, line 111, 112 also extend symmetrically in the −X planes, such that corresponding entrance and detection stigmatic foci pairs can also be used along such extensions of lines 110, 112 in the −X planes.

Because the points of stigmatic foci 54, 56 come in pairs for a given set of parameters, truly stigmatic imaging can only be performed at the corresponding entrance and detection focal points 54, 56 where they lay along lines 110, 112 for that set of parameters. That is, stigmatic imaging is not possible by using any two points on the same line 110 or 112, or by using any arbitrary point on line 110 and any arbitrary point on line 112 that are not within the relationship parameters described above. The points of stigmatic foci 54, 56 are always a discrete pair described by the equations 1, 2 and 3, and they will be located somewhere on the lines 110, 112, respectively, for the order number m and wavelength λ being used. Therefore, various colors or component wavelengths 12a-e that comprise a diffracted beam 12 will focus stigmatically at respective spaced-apart points 156, 256, 356, 456, 556 along the line 112, when the entrance pupil E is located at a respective point 154, 254, 354, 454, and 554 along line 110, as shown in FIG. 10. Detectors 201, 202, 203, 204, and 205 positioned at those locations can be used to detect the presence of those respective wavelength components in the diffracted beam 12 for spectroscopic analysis, as will be discussed more fully below.

It is interesting to note that lines 110, 112 intersect at point 24 on the Rowland circle, which is coincident with the center of curvature of the grating G. This point 24 is the only point on the Rowland circle where stigmatic focusing is theoretically possible. However, since the entrance pupil E and detection pupil D would have to be located at exactly the same point 24, the angle of diffraction is zero and no diffraction occurs. The point 24 is therefore of no use in diffraction spectroscopy. Also, as discussed above, the lines 110 and 112 continue into the negative X domain after intersection at point 24. Stigmatic imaging also occurs in the negative X domain but is not illustrated in FIG. 10 to avoid unnecessarily cluttering the drawing. However, such extensions 110′ and 112′ of lines 110, 112, respectively, into the −X domain can be seen in FIG. 11.

Figure 14:
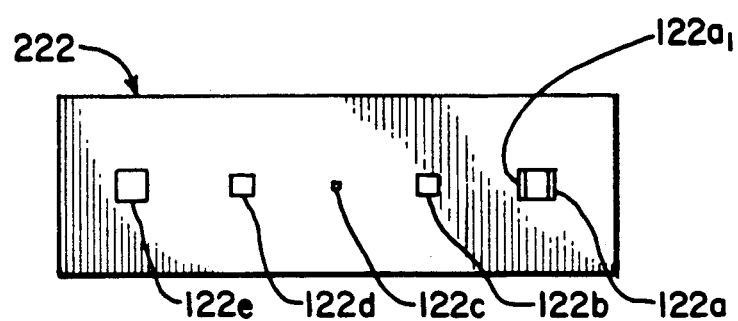
FIG. 14 is an elevation view representation of a stigmatic diffracted image according to this invention of a light beam having a plurality of wavelength components using the astigmatic best focus orientation of the detector surface.

With the stigmatic focusing, spectroscopic images of input light beams according to this invention appear as shown in FIG. 14, rather than the line images of prior art astigmatic images illustrated in FIG. 9. For example, an entering beam of light 10 passing through entrance pupil E in FIG. 10 and being comprised of multiple wavelength components will be diffracted by grating G, thereby separating the discrete wavelength components 12a-e in the diffracted beam 12 as described above and shown in FIGS. 5 and 6. However, instead of the astigmatic prior art line images 120a-e of the prior art distributed along the Rowland circle, as illustrated in FIG. 9, the images of the respective wavelength components according to the present invention appear as images 122a-e, as shown in FIG. 14. These images 122a-e of each wavelength component of the beam 12 could be seen, for example, on a single plane or detector 222 laid along line 112 or by a plurality of detectors, such as detectors 201, 202, 203, 204, 205 positioned along line 112, as shown in FIG. 10.

The images 122a-e are shown in FIG. 14 as they would appear on a single detector 222 laid along line 112. Note that not all of the images 122a-e of diffracted beam 12 appear in perfect stigmatic focus, rather, only one wavelength component 122c is in perfect stigmatic focus. The other components 122a, b, d, and e are astigmatic and appear as images of the grating aperture. This phenomenon illustrates the imaging that occurs with the mounting apparatus and method of the present invention. That is, because the points of stigmatic foci 54, 56 come in pairs for a given set of parameters, truly stigmatic imaging only occurs at corresponding entrance and detection stigmatic foci 54, 56 where they lay along lines 110, 112 for that set of parameters. Hence, image 122c in FIG. 14a lies on that image point 56 that corresponds to an entrance point coincident with stigmatic image point 54. The remaining wavelength components 122a, b, d, and e are not stigmatically focused because they are not located on the proper pair of entrance and detection stigmatic foci points for their respective wavelengths. However, these astigmatic images 122a, b, d, and e still have spectroscopic value as will be more fully discussed below.

The orientation of the detector surface 222 illustrated in FIG. 14a is along line 112 in FIG. 10. This particular orientation is referred to as the "astigmatic best focus" orientation. For reasons that will become apparent in the following discussion, this astigmatic best focus orientation is so named because it provides the best combination of concentrated light intensity for a given wavelength and spatial separation. However, other orientations are possible as will be more fully discussed below.

As discussed above, the "astigmatic best focus" spectroscopic images 122a–e of the present invention have the advantages of more concentrated light intensity than the protracted line images 120a–e of prior art astigmatic spectroscopic imaging, thus resulting in improved detection efficiency, throughput, and signal-to-noise ratio. However, an additional significant advantage of the astigmatic best focus orientation of the present invention is that two-dimensional spectroscopy can be performed, i.e., both spectral and entrance slit position information can be gathered simultaneously without the need for any additional lens focusing devices that would produce optical aberrations.

Figure 15:
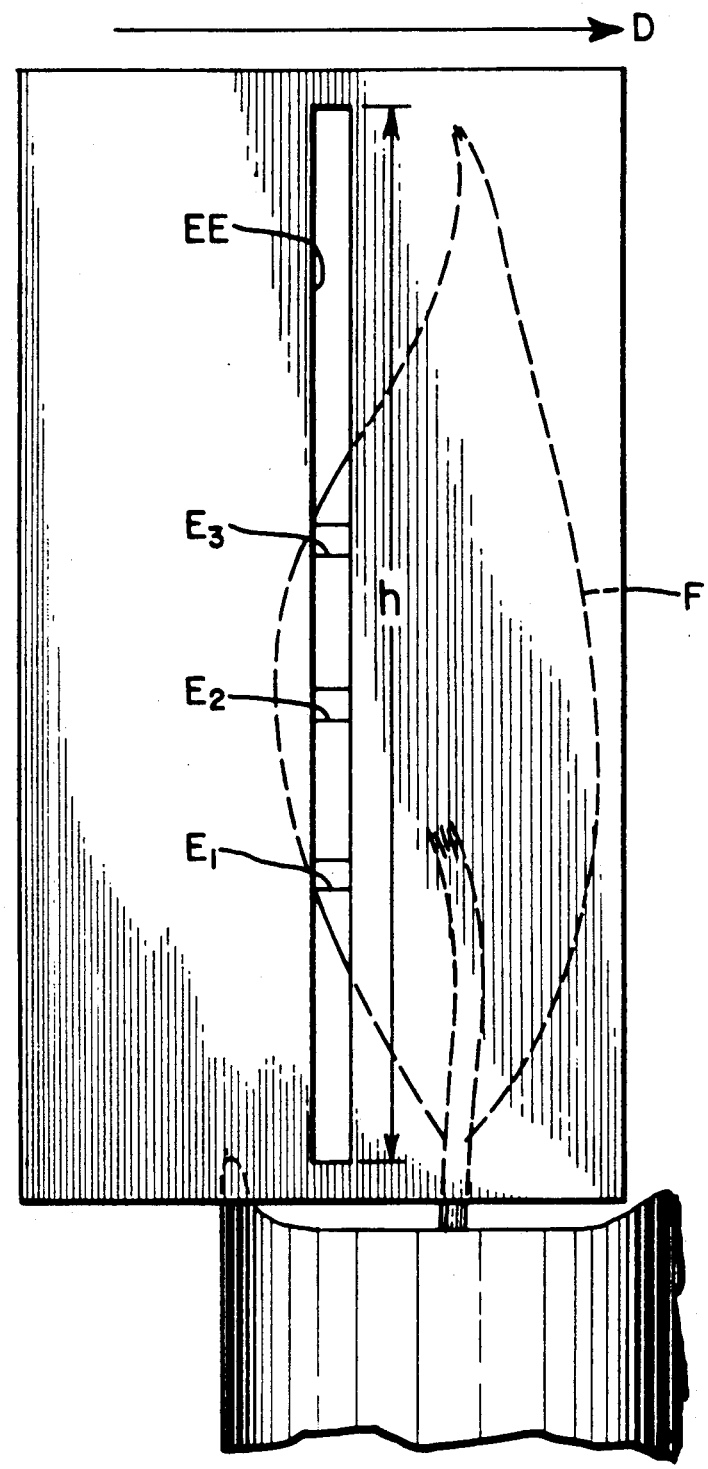
FIG. 15 is a schematic view in elevation illustrating two-dimensional image spectroscopy with an elongated entrance slit according to the present invention.
Figure 16:
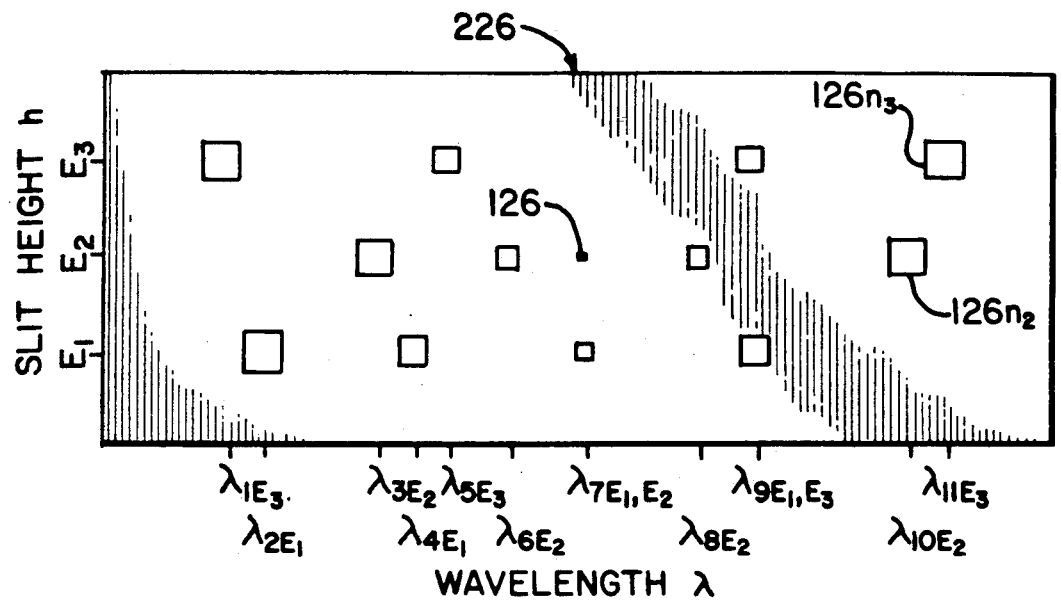
FIG. 16 is an elevation view of the images of the diffracted beams produced according to the present invention from the elongated entrance slit of FIG. 15.

For example, as illustrated in FIGS. 15 and 16, an elongated entrance slit, EE in FIG. 15, having a plurality of position, or height segments $E_1$, $E_2$, and $E_3$, can be wiped or passed over a larger, complex light source, such as a candle flame F. As the entrance slit EE in FIG. 15 moves in a direction D in relation to the flame F, detectors forming a two-dimensional array 226 in FIG. 16 can detect the component wavelengths of light passing through any or all positions along the height h of the entrance slit EE. An image of the light passing through the position or height segments $E_1$, $E_2$, and $E_3$, are shown in FIG. 16 for clarity in illustrating how two-dimensional spectroscopic data can be obtained. In reality, a continuous elongated slit EE would produce a continuous smear of light at a given wavelength extending vertically upward from a given wavelength shown along the horizontal scale in FIG. 16. By examining only those wavelengths passing through imaginary segments $E_1$, $E_2$, and $E_3$, a better understanding of the two-dimensional spectroscopy process can be gained. However, spectroscopists skilled in the art would be able to obtain such data from the continuous slit elongated EE by using a two-dimensional detector array.

Referring now to FIG. 16, spectral and entrance slit position data is represented as follows. The vertical dimension of detector 226 shows slit height position h while the horizontal dimension shows various wavelengths $\lambda$. Thus, the light passing through height position $E_1$ is shown consisting of four (4) discrete wavelengths $\lambda_{2E1}$, $\lambda_{4E1}$, $\lambda_{7E1}$, and $\lambda_{9E1}$. However, the light passing through slit position $E_2$ is shown consisting of five (5) discrete wavelengths $\lambda_{3E2}$, $\lambda_{6E2}$, $\lambda_{7E2}$, $\lambda_{8E2}$, and $\lambda_{10E2}$. Note that all of the light frequencies, and therefore wavelengths, of the light passing through slit position $E_2$ are different than those passing through slit position $E_1$, with the exception of the wavelength represented by $\lambda_7$. This wavelength is present at slit positions $E_1$ and $E_2$, but not at slit position $E_3$. This two-dimension spectroscopy thereby allows spectral data for each point along an elongated entrance slit to be obtained.

It is important to note a few more characteristics of the invention that are manifested in FIG. 16. First, the detector surface 226 is shown in the astigmatic best focus orientation, like FIG. 14, only one image point 126 is in perfect stigmatic focus. Also, as can be seen in FIG. 16, the astigmatism of each image increases as the distance from point 126 increases, therefore limiting resolution as the distance from 126 increases. That is, the box-like images $126_{n1}$, $126_{n2}$, etc., could begin to overlap, thus confusing the data. However, a very high resolution exists around point 126 because of the lower astigmatism around that point, thus allowing a relatively large area in which useful two-dimensional spectroscopy can be performed.

Figure 17:
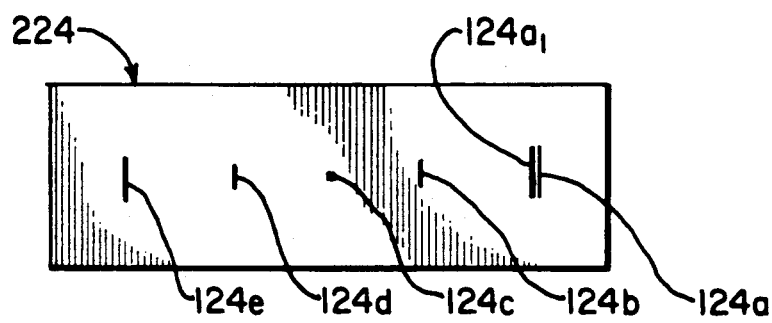
FIG. 17 is an elevation view representation of a stigmatic diffracted image according to this invention of a light beam having a plurality of wavelength components using the best spectral focus orientation of the detector surface.

As was briefly discussed earlier, other orientations other than the astigmatic best focus orientation are possible. FIG. 17 illustrates yet another orientation of the detector referred to as the "best spectral focus" orientation. In this orientation, the detector surface 224 does not lie along line 112, but instead would be oriented to produce sharply focused spectral lines 124a, b, d, and e. This orientation provides spectral resolution that is superior to the astigmatic best focus orientation of FIG. 14 because light at a given wavelength $\lambda$ is focused into a sharp line 124a as opposed to a box-like shape 122a in FIG. 14. For example, suppose a hyperfine wavelength structure exists around wavelength 124a such that another wavelength $124_{a1}$ is present, but has a slightly different wavelength. The best spectral focus orientation can resolve this difference whereas the hyperfine wavelength structure $122_{a1}$ is nearly obliterated by the large box-like image 122a of FIG. 14, thus making detection difficult. However, the quality of the slit height data is diminished with the best spectral focus orientation because that information is merged into a somewhat longer line such as 124e. Many other orientations are possible depending on the type and quality of data desired, and the present invention should not be construed as limited to the two orientations expressly discussed.

In one preferred embodiment illustrated in FIG. 12, a stigmatic vacuum spectrometer 500 useful for the purposes and spectroscopic operations described above can be constructed within the same physical confines of a vacuum chamber 400 as the prior art astigmatic vacuum spectrometer shown in FIG. 3. The stigmatic vacuum spectrometer 500, as shown pictorially in FIG. 12 and schematically in FIG. 13, may be compared conveniently to the prior art vacuum spectrometer 400 shown pictorially and schematically in FIGS. 3, and 4, respectively. Therefore, in the following description of the spectrometer 500 according to this invention, reference to FIGS. 3 and 4 are made when convenient to compare the stigmatic system 500 with the prior art astigmatic system 400.

In the prior art vacuum spectrometer 400 the diffractive elements 42 of the grating G in FIG. 3 and 4 are perpendicular to the plane of the paper, as is the grating G. In this configuration, then, the Rowland circle R in Rowland circle plane 17 lays within the plane of the paper. The angle of diffraction 32 is zero, that is, the central beam 12 is collinear with the grating normal N.

The preferred embodiment of the stigmatic vacuum spectrometer 500 mounts the grating G on a suitable mounting apparatus 350 that could be as complicated as a six-degree of freedom mounting as described below, or as simple as a fixed position mount. However, the grating G is not oriented as it is in the prior art system of FIGS. 3 and 4. Rather, the grating G is rotated 90° about its normal axis N, thereby orienting the diffractive elements 42 parallel to the plane of the paper. Likewise, the Rowland circle R and its plane 17 are now perpendicular to the plane of the paper. To use the same entrance port 410 and exit port 420 of the vacuum chamber 400, the grating G must also be tipped upward and to the right to properly align the entrance and exit ports 410, 420 of the vacuum chamber 400 with the stigmatic focus points 54, 56. It should be noted that depending on the wavelength λ and order number m of the diffracted beam 12, the grating G may have to be tilted downward or to the left, or both, to properly align the ports 410, 420 with the stigmatic focal points 54, 56. The entrance port 410 and exit port 420 may also have to be moved outwardly from their original positions shown by phantom lines 410' and 420' in FIG. 12, to properly locate the stigmatic focal points 54, 56. If the vacuum chamber 400 is sufficiently long, the same result could be accomplished by moving the grating G farther rearward, i.e., away from the entrance and exit ports 410, 420.

Figure 13:
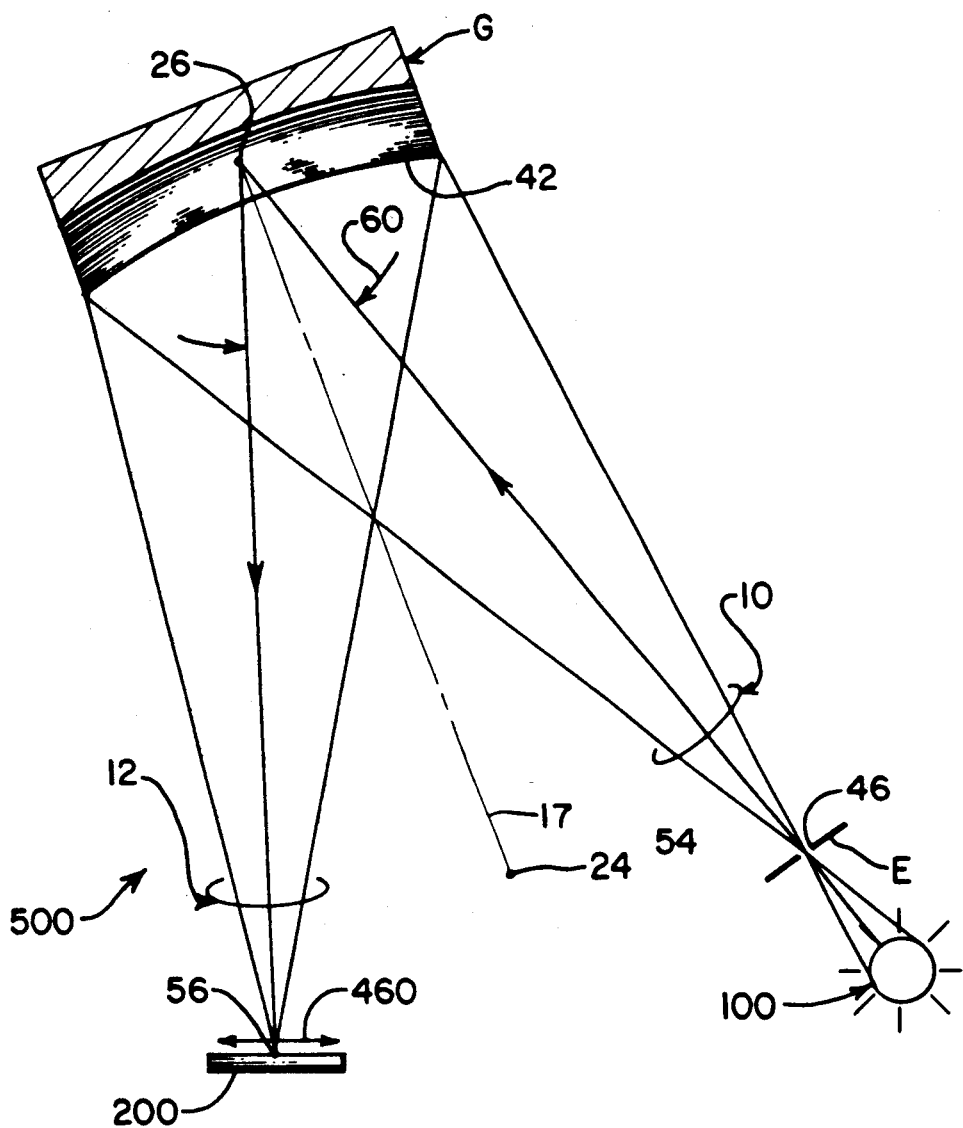
FIG. 13 is a schematic illustration in plan view of the imaging spectroscope according to this invention.

If the entrance pupil E, if used, is not axially symmetric, then it must also be rotated 90°. The prior art entrance pupil E in FIGS. 3, and 4 is shown as a slit with its elongated dimension perpendicular to the paper. Hence, in the preferred embodiment 500 of the present invention, the elongated dimension of the slit 46 in pupil E is parallel to the paper, as best seen in FIG. 12. The diffracted image that appears at the exit pupil D in the preferred embodiment 500 is likewise turned 90°. In the prior art system 400, the wavelength components fan out in the plane of the paper, as shown by arrow 450 in FIG. 4, whereas, in the preferred embodiment of the stigmatic vacuum spectrometer 500, the wavelength components fan out perpendicular to the paper. Since the image is stigmatic, slit height information is available and lays parallel to the plane of the paper, as indicated by arrow 460 in FIG. 13. Of course, a projecting apparatus 100 and detecting apparatus 200 can be used depending on the desired application. For example, a laser 104 and focusing lens 102 could be used as shown in FIG. 13.

The opening angle 60 in the preferred embodiment 500 in FIG. 12 is shown identical to the angle 30 in FIGS. 3 and 4, to illustrate the ability of the stigmatic vacuum spectrograph system 500 of this invention to be positioned and operated in a conventional vacuum chamber used to house a typical astigmatic prior art system 400. Hence, the opening angle 60, commonly one of the most fixed dimensions in many vacuum spectrometer designs, can remain constant for a given wavelength λ.

From the description above, it should also now be understood that vacuum scanning spectroscopy could also be accomplished by movably positioning the entrance pupil E and exit pupil D along the lines of stigmatic foci 110, 112 shown in FIGS. 10 and 11. The same result could be accomplished by moving the grating G and only the entrance pupil E or by moving the grating G and the exit pupil D. Such results could be obtained, for example, by utilizing a six-degree of freedom micro positioning device 350 for grating G and a suitable translation device 360 or 360' to translate the entrance pupil E, the exit pupil D, or both, as shown in FIG. 12.

If a given set of lines of stigmatic foci 110 and 112 for a given set of parameters, as described above, are rotated about the Z axis, a surface of revolution 38, as shown in FIG. 11, is defined. It was discovered during development of this invention that the best astigmatic foci for any points that are not stigmatically paired lie on this surface. This surface of revolution 38 can be described by the equation $Z=R/\{[(2-(R/Z))(X^2+Y^2)/2Z^2]+1\}$, which can be derived by employing standard mathematical techniques to generate a formula for a surface of revolution about an axis once the equations for lines 110, 112 are known according to this invention. Hence, near stigmatic imaging can also be accomplished by locating the entrance pupil E at a first point, for example, point 64, on surface 38 and by locating the detection pupil D at a second point, for example, point 65, on surface 38. Continuing with this example, a projection apparatus 100, as shown in FIG. 11, can be used to project an incident beam 10 through an entrance point 64 toward grating G, whereupon it is diffracted and reflected as a diffracted beam 12 that falls in near stigmatic focus at detection point 65 on surface 38 and can be detected by a detection apparatus 200, as described above. Such near stigmatic imaging on the surface of revolution 38, which is really a surface of astigmatic best focus for the system configuration, while not being totally stigmatic like those points of 54, 56 on the lines 110 and 112, can produce some new and useful methods of spectroscopy that have not been available before. Of course, the closer the points 64, 65 are to the lines 110, 112, the nearer the imaging will be to perfect or true stigmatic imaging.

The foregoing is considered as illustrative only of the principles of the invention. Further, since numerous modifications and changes will readily occur to those skilled in the art, it is not desired to limit the invention to the exact method as shown and described, and accordingly all suitable modifications and equivalents may be considered as falling within the scope of the invention as defined by the claims which follow.

The embodiments of the invention is which an exclusive property or privilege is claimed are defined as follows:

1. Optical spectroscopy apparatus for analyzing the characteristics of a light beam, comprising:
    a concave spherical diffraction grating having a radius of curvature and plurality of parallel diffraction rulings inscribed thereon, wherein one of said rulings is a center ruling that passes through the center of the grating and an optical axis projects outwardly from the center of the grating through the center of curvature of the grating;
    beam entrance means for projecting an entrance beam of light through an entrance point; and
    beam detection means for detecting a beam of light that passes through said entrance point and is diffracted by said grating to pass through a detection point, wherein said entrance point and said detection point are located at about respective positions defined in relation to the grating and to each other by the equations:

$$Z = R \frac{(1 + \cos 2\theta)}{2}$$

$$X = \pm Y = Z \sqrt{\frac{\left(\frac{R}{Z} - 1\right)}{\left(2 - \frac{R}{Z}\right)}}$$

$$\theta = \sin^{-1} \frac{m\lambda}{2d}$$

where:
- R = radius of curvature of the grating;
- d = spacing of the rulings;
- m = order number of the diffracted beam being detected;
- λ = wavelength of the diffracted beam being detected; and
- Θ = the in-plane diffraction angle for the particular grating and wavelength; and further, where the X, Y, and Z values are spatial positions in an X, Y, Z coordinate system wherein the origin of the coordinate system is coincident with the optical center of the grating where the light is incident, the Z coordinate axis is collinear with the optical axis, the X coordinate axis is orthogonal to both the Z axis and the central ruling, and the Y coordinate axis is orthogonal to both the Z and X coordinate axes.

2. Optical spectroscopy apparatus, comprising:
a concave spherical diffraction grating having a radius of curvature and plurality of parallel diffraction rulings inscribed thereon, wherein one of said rulings is a center ruling that passes through the center of the grating and an optical axis projects outwardly from the center of the grating through the center of curvature of the grating;
beam entrance means for projecting an entrance beam of light through an entrance point; and
beam detection means for detecting a beam of light that passes through said entrance point and is diffracted by said grating to pass through a detection point, said entrance and detection points both being positioned in spaced-apart relation to each other and to said grating at respective locations on a surface of revolution and not on the Rowland circle where the beam is nearly stigmatically focused at both said entrance and detection points, wherein said surface of revolution is defined in relation to the grating by the equation:

$$Z = R / \{[(2-(R/Z))(X^2 + Y^2)/2Z^2] + 1\},$$

where R is the radius of curvature of the diffraction grating, and X, Y, and Z are respective spatial positions in an X, Y, Z coordinate system wherein the origin of the coordinate system is coincident with the center of the grating, the Z coordinate axis is collinear with the optical axis, the X coordinate axis is orthogonal to both the Z axis and the central ruling, and the Y coordinate axis is orthogonal to both the Z and X coordinate axes.

3. A method of spectroscopic analysis of a light beam, comprising the steps of:
directing the light beam through an entrance point and onto a concave spherical diffraction grating having a radius of curvature and a plurality of parallel diffraction rulings thereon wherein one of said rulings is a central ruling that passes through the center of the grating and an optical axis projects outwardly from the center of the grating through the center of curvature of the grating; and
detecting the diffracted light beam at a detection point, wherein said entrance point and said detection point are positioned at about respective locations adjacent said grating and in spaced-apart relation to each other at about respective locations with respect to said grating defined by the equations:

$$Z = R \frac{(1 + \cos 2\theta)}{2}$$

$$X = \pm Y = Z \sqrt{\frac{\left(\frac{R}{Z} - 1\right)}{\left(2 - \frac{R}{Z}\right)}}$$

$$\theta = \sin^{-1} \frac{m\lambda}{2d}$$

where:
- R = radius of curvature of the grating;
- d = spacing of the rulings;
- m = order number of the diffracted beam being detected;
- λ = wavelength of the diffracted beam being detected; and
- Θ = the in-plane diffraction angle for the particular grating and wavelength; and, further, where the X, Y, and Z values are spatial positions in an X, Y, Z coordinate system wherein the original of the coordinate system is coincident with the optical center of the grating, the Z coordinate axis is collinear with the optical axis, the X coordinate axis is orthogonal to both the Z axis and the central ruling, and the Y coordinate axis is orthogonal to both the Z and X coordinate axes.

4. A method of spectroscopic analysis of a light beam, comprising the steps of:
directing the light beam through an entrance point and onto a concave spherical diffraction grating having a radius of curvature and a plurality of parallel diffraction rulings thereon wherein one of said rulings is a central ruling that passes through the center of the grating and an optical axis projects outwardly from the center of the grating through the center of curvature of the grating; and
detecting the diffracted light beam at a detection point, wherein said entrance and detection points are both positioned in spaced apart relation to each other and to said grating at respective locations on a surface of revolution and not on the Rowland circle where the beam is nearly stigmatically focused at both said entrance and detection points, wherein said surface of revolution is defined in relation to the grating by the equation:

$$Z = R / \{[(2-(R/Z))(X^2 + Y^2)/2Z^2] + 1\},$$

where R is the radius of curvature of the diffraction grating, and X, Y, and Z are respective spatial positions in an X, Y, Z coordinate system wherein the origin of the coordinate system is coincident with the center of the grating, the Z coordinate axis is collinear with the optical axis, the X coordinate axis is orthogonal to both the Z axis and the central ruling, and the Y coordinate axis is orthogonal to both the Z and X coordinate axes.

* * * * *